United States Patent
Dandekar et al.

(10) Patent No.: US 11,540,120 B2
(45) Date of Patent: Dec. 27, 2022

(54) PHYSICAL LAYER KEY BASED INTERLEAVING FOR SECURE WIRELESS COMMUNICATION

(71) Applicant: Drexel University, Philadelphia, PA (US)

(72) Inventors: Kapil R. Dandekar, Philadelphia, PA (US); James J. Chacko, Huntingdon Valley, PA (US); Kyle Joseph Juretus, Quakertown, PA (US); Marko Jacovic, Philadelphia, PA (US); Cem Sahin, Peoria, AZ (US); Nagarajan Kandasamy, Philadelphia, PA (US); Ioannis Savidis, Wallingford, PA (US)

(73) Assignee: Drexel University, Philadelphia, PA (US)

( * ) Notice: Subject to any disclaimer, the term of this patent is extended or adjusted under 35 U.S.C. 154(b) by 358 days.

(21) Appl. No.: 16/432,509

(22) Filed: Jun. 5, 2019

(65) Prior Publication Data

US 2019/0373458 A1     Dec. 5, 2019

Related U.S. Application Data

(60) Provisional application No. 62/680,641, filed on Jun. 5, 2018.

(51) Int. Cl.
| | | |
|---|---|---|
| *H04W 12/033* | (2021.01) | |
| *G06F 7/58* | (2006.01) | |
| *H03M 13/27* | (2006.01) | |
| *H04W 12/041* | (2021.01) | |
| *H04L 5/00* | (2006.01) | |

(52) U.S. Cl.
CPC .......... *H04W 12/033* (2021.01); *G06F 7/584* (2013.01); *H03M 13/271* (2013.01); *H03M 13/2732* (2013.01); *H04W 12/041* (2021.01); *H04L 5/0007* (2013.01)

(58) Field of Classification Search
CPC .............. H04W 12/033; H04W 12/041; G06F 7/584; H03M 13/271; H03M 13/2732
USPC ........................................................ 380/270
See application file for complete search history.

(56) References Cited

U.S. PATENT DOCUMENTS

| | | | | |
|---|---|---|---|---|
| 2002/0083279 | A1* | 6/2002 | Shahrier | H04L 1/0071 711/157 |
| 2006/0101485 | A1* | 5/2006 | Nishimoto | H04N 21/4113 725/31 |
| 2006/0204009 | A1* | 9/2006 | Li | H04W 12/037 380/255 |
| 2009/0257523 | A1* | 10/2009 | Varadarajan | H04B 1/04 375/295 |

(Continued)

FOREIGN PATENT DOCUMENTS

EP            696108 A1 *  2/1996    ............ H03M 13/00

*Primary Examiner* — Jacob Lipman
(74) *Attorney, Agent, or Firm* — Schott, P.C.

(57) ABSTRACT

A key-based interleaver for enhancement the security of wireless communication includes a physical layer communication channel key to provide security even when the software encryption key is compromised. A method of creating a secure communication link using a physical layer interleaving system includes implementing a key policy implementation that utilizes temporal dependency and interleaving bits using a flexible inter and intra-block data interleaver.

18 Claims, 5 Drawing Sheets
(5 of 5 Drawing Sheet(s) Filed in Color)

(56) References Cited

U.S. PATENT DOCUMENTS

2019/0044761 A1* 2/2019 Kwak ................ H04J 13/0022

* cited by examiner

| Resource utilization | Table 1 | | | | | |
|---|---|---|---|---|---|---|
| Size | Slices | | FFs | | LUTs | |
| | Base | Secured | Base | Secured | Base | Secured |
| $2^7$ | 332 | 354 | 631 | 677 | 698 | 725 |
| $2^8$ | 338 | 347 | 634 | 680 | 708 | 723 |
| $2^9$ | 342 | 362 | 635 | 681 | 702 | 739 |

PHYSICAL LAYER KEY BASED INTERLEAVING FOR SECURE WIRELESS COMMUNICATION

STATEMENT REGARDING GOVERNMENT SUPPORT

This invention was made with government support under Contract No. Grant Nos. CNS-1228847, CNS-1730140, and CNS-1816387 awarded by the National Science Foundation. The government has certain rights in the invention.

BACKGROUND

A methodology to secure Direct-Sequence Code Division Multiple Access by applying Advanced Encryption Standard (AES) based interleaving has previously been explored by others. The secure block interleaving scheme may load the data into an M×N matrix and perform row and column permutations based on the AES algorithm to generate an interleaved sequence. The row and column permutations may be completed by utilizing a plaintext and a key and the AES key may be shared between the transmitter and receiver, generating a ciphertext used as the row or column index for the interleaved output. The permutations are repeated for each row and column in the M×N matrix until the interleaved sequence is fully generated.

Transmitting both the plaintext and key for each row and column index to the receiver provides an adversary with additional opportunities to intercept the shared information. Using an expensive AES operation to generate each row and column index for the interleaved output also limits the ability to update the interleaver mapping. Finally, using AES generated row and column indices does not increase the effort required for a brute-force attack to recreate the M×N matrix. The technique was extended for use in orthogonal frequency division multiple access (OFDMA) systems, which may remap subcarriers based on an AES permutation.

Another method enhances security by implementing interleaving after the modulation phase in the communication pipeline. The technique involves the remapping of complex values representing in-phase and quadrature phase pairs. Performing interleaving on fixed point data increases the memory overhead as storage of 16-bit fixed point numbers is required, as compared to the single bit storage required for the technique described in this paper. The increased overhead limits the implementation of inter-symbol interleaving between frames.

SUMMARY OF THE EMBODIMENTS

The proposed Phy-Leave technique includes a flexible interleaver with low hardware overhead and provides the ability to rapidly update the key used to generate the interleaving sequence. The size of the interleaver is only bounded by the size of the data buffer, allowing for the interleaving of multiple symbols, which results in an additional barrier for an adversary to overcome when decoding a transmitted message. A time-varying key at the PHY layer is also applied to provide security when the software-based session key is compromised. The developed technique secures the transmitted message at the PHY layer without significantly increasing the overhead in area and performance.

In another embodiment, PilotCrypt rearranges data-bearing and pilot tone sub-carriers, requiring the receiver and transmitter to share a secret key before communication. The unique identical keys can either be the result of shared, present, or generated processes, but the key will determine how the data and pilot signals are rearranged. The core architecture PilotCrypt is built on, Scalable Orthogonal Frequency Division Multiplexing (SOFDM), provides a high flexibility, which allows for data and pilot sub-carrier assignment on a symbol to symbol basis. The ability for an eavesdropper to perform a brute force attack prior to the key being altered is severely reduced due to the capability of the aforementioned system to modify sub-carrier allocation. An eavesdropping adversary will not be able to receive the correct information as the pilot tone and data allocations are unknown. As a physical layer-based security technique integrated with an OFDM pipeline, PilotCrypt requires a low power and low resource utilization implementation. Low overhead security is vital for IoT applications that struggle to handle software layer=based security. Specific applications may either use this as a low-cost security solution, or an additional security component to existing software level security, creating a more challenging system for an adversary to crack.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

I. Phy-Leave

1. Introduction

Consider the case of Bob and Alice exchanging messages over a wireless channel in the presence of Eve, an eavesdropper. To detect a message in flight and to correctly decode it, Bob and Alice must mutually agree on the rules governing the structure, or syntax, of the message—specifically, the length and pattern of the preamble, placement of pilot patterns for signal-distortion compensation, and the error detection and correction scheme. If Eve has prior knowledge of the structure, she too can successfully decode the message. If, however, the structure is obfuscated at run time using a secret key known only to Bob and Alice, Eve cannot decode the message. A real-time packet obfuscation method at the physical (PHY) layer described herein for communication protocols that use orthogonal frequency division multiplexing (OFDM) may deter the eavesdropper Eve.

Figure 1:
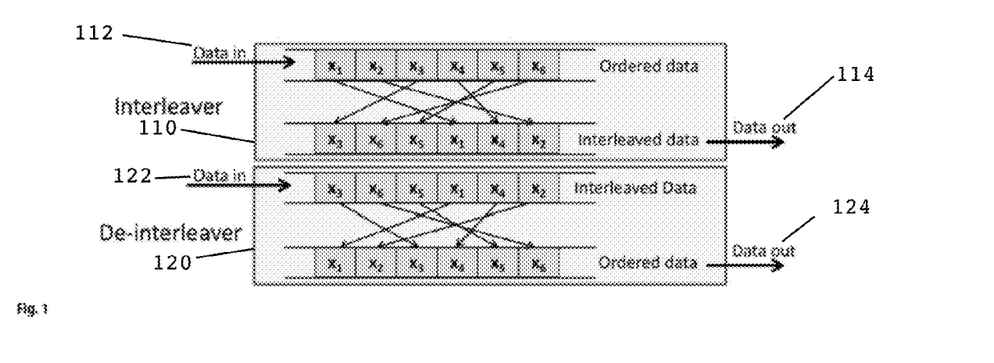
FIG. 1 shows operation of an interleaver and de-interleaver.

The interleaver and de-interleaver stages of an OFDM pipeline may be selected for the obfuscation of a packet. The operation of a basic interleaver 110 and de-interleaver 120 at a transmitter and receiver respectively, where the encoded ordered data 112 enters in-order and is scrambled based on a mapping scheme to produce a different output-order data out 114 that is transmitted to a receiver in a packet where the received data 122 is de-interleaved in a de-interleaver 120 back into ordered data and output 124, as shown in FIG. 1. Scrambling the data reduces the effect of burst errors, as the errors are distributed throughout the transmitted data when de-interleaved at the receiver. Transmitted data with more evenly distributed errors provide a higher probability of being corrected by a Viterbi decoder. Therefore, interleaving may be used in communication systems to improve the performance of forward error correcting (FEC) codes when observing burst errors. In a typical OFDM pipeline, interleaving may be done immediately after the encoder stage and de-interleaving right before the decoder stage.

Although the primary function of an interleaver is to improve the reliability of transmitting a message, the interleaver also provides an opportunity to obfuscate communication transmissions from Eve. The design and implementation of a real-time reconfigurable interleaver and de-interleaver stage within the OFDM pipeline is described, which dynamically changes the input-output mapping as shown in FIG. 1, subject to a secret key known only to Bob and Alice. The reconfigurable structures may implemented such that the area and computational overhead to secure the OFDM pipeline is minimal. The obfuscation of the packet may be performed at the PHY layer rather than at a higher-level software layer to support real-time operation of the pipeline. A policy by which Bob and Alice extract and agree on secure keys may also be implemented at the PHY layer that governs the mapping strategy at the interleaver and de-interleaver. The generation of the key is dynamic in that the key is regenerated periodically at run time based upon an agreed synchronization schedule. The key policy also utilizes shared channel-state estimation at the PHY layer between the transmitter and the receiver to generate symmetric encryption keys at run time. These methods may generate keys that guard against protocol vulnerabilities in Wired Equivalent Privacy (WEP) and WiFi Protected Access (WPA) due to the use of pre-shared keys that enable man-in-the-middle and eavesdropping attacks.

The performance of the secure OFDM pipeline may be evaluated through both simulation and experimental implementation on a Virtex6 FPGA board. Results under different channel conditions indicate that Eve is unable to recover the transmitted message without knowledge of the secret key. The area overhead as compared to the baseline OFDM pipeline is less than 1% of used FPGA resources. The effect on pipeline throughput is also quantified, which is a function of the interleaver depth and the length of the key. The impact on error correction during normal operation of the proposed interleaving scheme is characterized to confirm continued functionality through channel conditions that include additive white Gaussian noise (AWGN).

The system and method herein can be used in wireless communications devices like mobile phones, home network devices, military communications equipment, internet of things devices, and other similar communications devices.

2. Threat Model and Key Generation

The PHY-based method to generate keys—one that exploits shared channel state information—is described in this section. Other security methods such as the use of pre-shared keys may also be used with the proposed methodology, however, the security vulnerabilities discussed in the introduction may apply to the software layer encryption key.

2.1 Threat Model

The primary threats considered herein, while not exhaustive, are eavesdropping and a man-in-the-middle attack in which Eve tries to impersonate either Alice or Bob. The assumption is that Eve has clear access to the channel and is able to probe the channel between herself and Alice or Bob, including when the secure channel is formed. A further assumption is that Eve has complete knowledge of all the algorithms used to secure the communication between Alice and Bob, as well as knowledge of the hardware that implements the proposed Phy-Leave packet obfuscation. However, Eve is not colocated with Alice or Bob; there is a spatial separation of at least one wavelength. As Eve is also aware of the key extraction algorithm used by Alice and Bob, it is possible that Eve records the transmitted information for analysis at a later time. Finally, a scenario in which Eve is able to determine the software encryption key is also considered, and the generation of a time-varying key, as described hereafter is implemented as a means to mitigate the threat. As Eve is not co-located with Alice or Bob, it is assumed that Eve does not have access to the hardware of either party and is, therefore, not able to perform a known plaintext attack. Additional measures to protect against known-plaintext attacks are possible, including obfuscation of the preamble.

Active attack scenarios are also possible, where Eve is actively interfering with the transmission of data between Alice and Bob. Active attacks include, but are not limited to, masquerade attacks, replay attacks, selective forwarding, node replication, wormhole attacks, and sybil attacks. These attacks all involve Eve recording or manipulating a valid transmission by Alice to either gain unauthorized access or disrupt communication. The generation and use of a time-varying key, as discussed hereafter, provide a means to limit an adversary from using a previous transmission for nefarious purposes, as the receiver no longer recognizes the data as valid with an incorrect key.

2.2 Generation

The wireless channel between Alice and Bob is used as a source of common randomness to generate a correlated random bit sequence that is then used to produce a shared secret key. The secret key is applied to secure the communication link between Alice and Bob, while Eve is unable to generate the same key as the channel reciprocity between Alice and Bob is not available to Eve.

Generation of keys based on temporal-spatial properties has previously been explored, where keys are generated for low-complexity body sensors. In some methods, a key generation technique based on channel reciprocity uses an initial analysis period during which the channel between two radios is sampled using probing packets. The probe packets are assembled at both ends of the communication link and, once enough packets are exchanged, each node independently filters the estimated channel measurements to reduce the impact of fast fading. Once filtering is complete, the nodes compute the standard deviation of the measured channel transmissions, which is used as a threshold to determine if the sampled bit at each time index is a 1, 0, or undefined. A window is then applied to the extracted bits. A bit is considered present at both radios within the window if there are N consecutive bits of the same value. Finally, one radio sends the indices of the estimated bit locations to the other radio, and the other radio replies with a list of confirmed indices that it agrees contain useful bits. The bit sequence is extracted from the final list of indices and is agreed upon as the shared key. Note that Eve only has information pertaining to which samples are used as the bits, but not the values of the samples themselves. In addition, as the wireless channel is reciprocal only between the two cooperating radios, Eve cannot extract the same bit sequence, leaving her with a useless key.

Another method was recently extended into a real-time technique that relies on 802.11 preamble information rather than using dedicated probing packets. The bursty and asymmetric nature of the application-layer traffic may be accounted for by applying a sampling technique.

On each radio, an internal timer interrupt occurs approximately once per channel-coherence time interval, which is dependent on the environment and ranges between tens to hundreds of milliseconds. When an interrupt occurs, the next received packet transmitted from a participating radio is used in the channel estimation process. While mobility improves the uniqueness of the channel and provides increased confidence in the extracted bits, high mobility also results in shorter channel coherence times. If a key update occurs solely based on interrupts, scenarios with high mobility lead to increased computational overhead due to frequent updates of the key. To limit the computational overhead, the key is valid for a variable amount of time independent of the frequency of the occurring interrupts.

3. System Design and Implementation

The implementation of the proposed obfuscation technique to secure a communication link is described in this section, including a policy for generating time-varying keys at the PHY layer. The data interleaving policy, which is a function of the obtained key, is discussed. An implementation of the obfuscation technique on an FPGA is also described.

3.1 PHY-Based Packet Obfuscation

Figure 2:
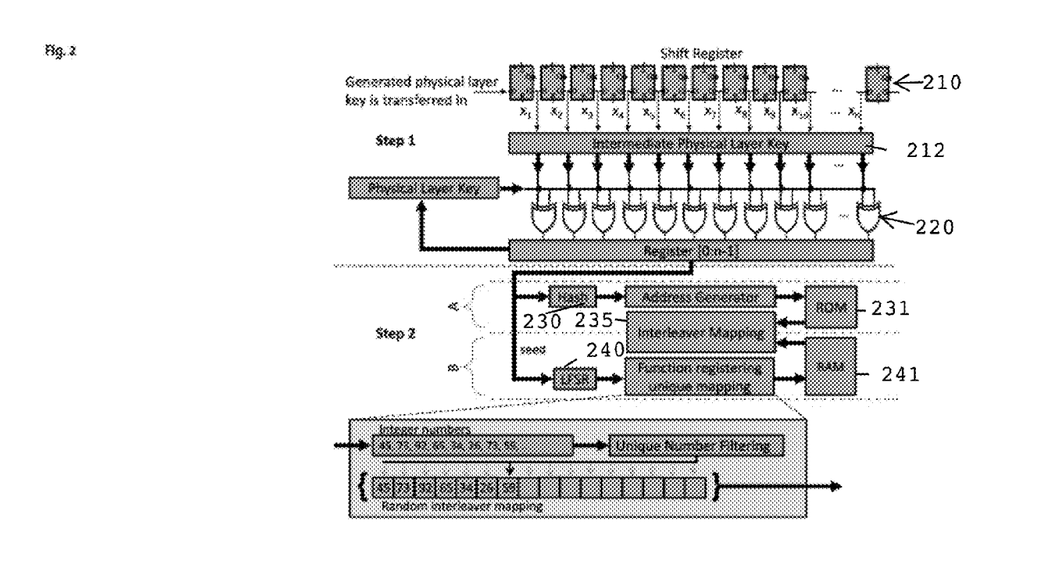
FIG. 2 shows an overview of the proposed packet obfuscation technique.

The method used to generate the key at the PHY layer and the use of the created key to determine the input-output mapping for the interleaver are illustrated in FIG. 2. The steps involved in the generation and application of the key are described as Step 1 and Step 2, respectively.

Step 1: Generating the Shared Key

The shared key is generated as described in Section 2.2 using a technique developed by Katz B Z, Sahin C, Dandekar K (2016) Real-time wireless physical layer encryption in: Proceedings of the IEEE annual wireless and microwave technology conference. The channel state is estimated independently at the transmitter and the receiver based on the packets exchanged between the two. The state is used to generate bits based on the channel symmetry that form the key, which are continuously placed into a shift register 210 as shown in FIG. 2. The bits may be continuously updated until a system specified event occurs, upon which the current key value may be transferred from the shift registers into memory 211. The system event may be either time-triggered based on an interrupt or event-triggered based on the number of packets successfully transmitted or received. At this point, the key is (1) used on its own, (2) mixed with a software encryption key from the application layer, or (3) mixed with the previously valid physical encryption key to generate a more secure key. The key mixing function 220 shown in FIG. 2 is applied with XORs, however, a hash or AES-based implementation of the mixing function is also possible to secure against the threat of a one-time pad. By generating the shared key from prior valid keys, adversaries may be restricted to a fixed window to determine and utilize a given key.

Step 2: Controlling the Interleaver Mapping

The PHY-layer key generated by the process described in Step 1 is used to control the interleaving sequence within the OFDM pipeline. The proposed system supports two different implementations of interleaver sequencing. For the first approach (Labeled as Method A in FIG. 2), the lower-order k bits are extracted from the PHY-layer key and a hash 230 is applied as an address to index into the memory (ROM) 231 that stores multiple pre-computed input-output mapping schemes 235 for the interleaver to use. The second approach (Method B) uses a Fibonacci Linear-Feedback Shift Register (LFSR) 240 to generate pseudo-random interleaving mappings on the fly and stores the mappings into volatile memory (RAM) 241. For Method B, the PHY-layer key is used as the initial seed to the LFSR, and the output from the LFSR is used to produce random memory mappings that are stored in the RAM. As the output bits of the LFSR are not transmitted, the adversary is not able to use the Berlekamp-Massey algorithm.

The primary difference between Method A and Method B is the execution time required to produce an optimal mapping of the interleaving. To avoid non-deterministic key generation times possible when applying Method B and sharing predetermined keys as done with Method A, a mixed technique is implemented that applies Method B to generate the mapping sequences placed into the RAM and then uses Method A to hash the sequences. Placing mapping schemes into a RAM allows for caching sequences, which permits faster key updates and deterministic update policies. Further work is required to analyze the threat of an adversary determining future physical layer keys based on attacks to stored potential keys in RAM.

Figure 3:
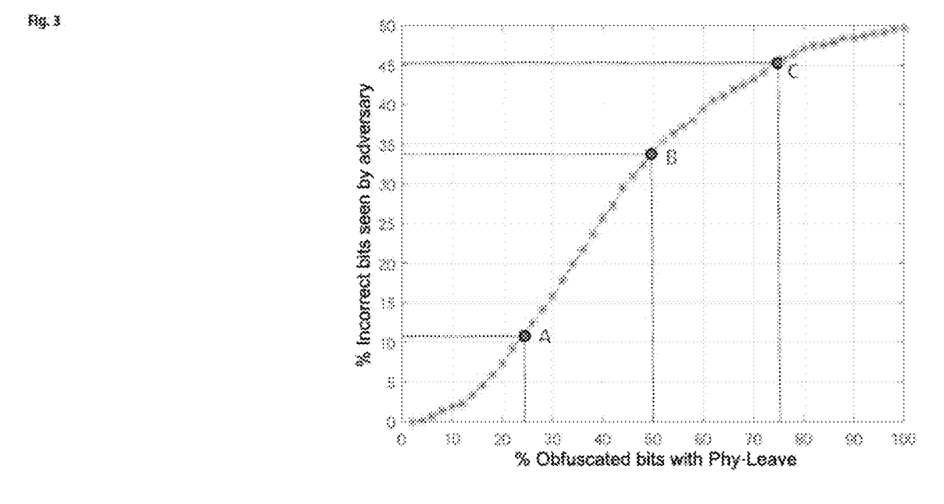
FIG. 3 shows a comparison of the percentage of correct bits seen by the adversary with respect to the percentage of the transmission frames secured using Phy-Leave.

Mapping sequences may be utilized to create an interleaved data sequence at the transmitter and a de-interleaved sequence at the receiver. A large Hamming distance is needed for the generated mapping, in contrast to the standard-based interleaver sequence used for wireless communication, as a small difference between the two interleaving sequences allows adversaries to apply FEC algorithms to decode the transmission. Point A in FIG. 3 represents the case where the generated mapping scheme does not produce a significant Hamming distance from the standard interleaver sequence. In such a case, the interleaver sequence is regenerated to produce a larger Hamming distance from the standard-based interleaver.

3.2 Challenges in Synchronization

Synchronously updating the mapping of both the transmitter and receiver interleavers with a new unique key may be the primary challenge of the proposed key policy. To address synchronization issues including clock drift, the proposed key policy may use a combination of asynchronous and synchronous phases between the transmitter and receiver. During the asynchronous phase, a unique channel-derived key is generated every 5 to 10 packets, which is then loaded into the shift registers present at both the transmitter and receiver on a packet-based interval independent of the system clock.

The entire proposed physical layer-based security mechanism, after the availability of an intermediate physical layer key (see FIG. 2) at both the transmitter and receiver, may require strict synchronization. Once the key bits are selected and transferred to the intermediate physical layer key stage, the bits are available to the software layer as a session key.

To avoid dependence on board clocks, the proposed security methodology is driven by interrupts generated based on successful packet transmissions observed at the transmitter and receiver. The packet-based interrupt mechanism generates one pulse per successful packet transfer, which is indicated by the reception of an ACK packet from the receiver to the transmitter. The recovery from lost packets in the channel medium involves shifting the LFSR forward by a known number of steps, which is derived from the initial physical layer key both at the transmitter and receiver, at the end of a timeout with a fixed duration.

A strict packet-based synchronization may be assumed within the experimental framework through an external signal whose frequency is assigned from a set of predetermined values. The external signal is available to the circuit block at both the transmitter and receiver implementing the physical layer security technique. The use of the MAC layer for cross-layer synchronization to remove the considered assumptions is beyond the scope of this paper.

3.3 FPGA-Based Implementation

Figure 4:
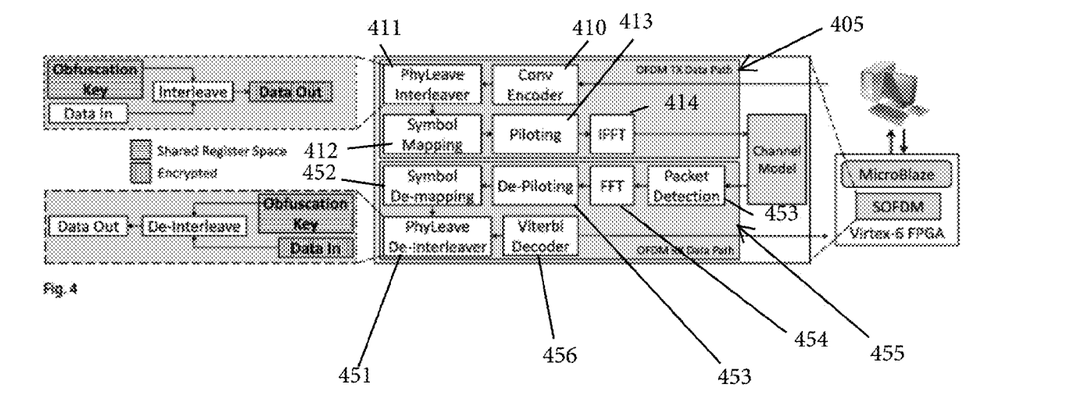
FIG. 4 shows a system layout of the SDC testbed showing the (de)obfuscation based (de)interleaving modules in the transmit and receive chain.

Hardware verification of the secure interleaving method is implemented on the Software Defined Communication (SDC) testbed. The SDC testbed is a highly flexible physical layer implementation of an OFDM pipeline that enables rapid prototyping for wireless research, allowing for the pipeline modifications necessary to implement the PhyLeave system. The modifications to the OFDM pipeline, as shown in FIG. 4, are applied in the SDC testbed to experimentally characterize the Phy-Leave system.

3.3.1 Implementation of Key Policy on FPGA

The key policy discussed in Section 3.1 is adapted to an FPGA fabric. To implement the key policy on an FPGA, the bits generated from the real-time algorithm described in Section 2.2 may be placed into a shift register capable of storing N bits, where N is the size of the key. After each interrupt, a new key bit may be generated, replacing one of the previous key bits. A separate counter that is either time or packet dependent (time in the current implementation) may be added to determine when the content of the shift register is stored in memory. The content stored in memory may serve as the key for the software layer for the current time session. The current session key applied within the software layer may be XORed with the physical layer key, which was initialized to all zeros, to create a new temporally dependent key. The XORing of the software and physical layer keys increases the number of key sequences an adversary must attempt to successfully determine the physical layer key. The key generation procedure results in more bits than needed, 1024 bits in this work. A frame of 100 bits may be extracted from the 1024 bits to use with the proposed interleaving scheme.

The 1024 bits are produced through the implementation of a key generation algorithm, which generates keys based on a few packet exchanges between the active non-adversarial transmitter and receiver. Although only a fraction of the 1024 bits may be utilized for both implementations (Methods A and B), the additional bits allow for securing other circuit sub-blocks of the OFDM pipeline.

3.3.2 Implementation of the Key Update Procedure on FPGA

The interleaver block controller may update the key to allow for scalability and modularity. In the first phase, the block controller finishes interleaving the data already present within the buffer belonging to the frame currently being processed. The obfuscated interleaving of further data is stalled until the new physical layer key can be generated, which prevents the loss of valid data that was in transit. The duration of the stall is dependent on the mixing function utilized in the proposed packet obfuscation technique shown in FIG. 2, with the XOR mixing function only requiring a stall of a single cycle. If the duration of the stall of the mixing function is too large, the process to update the key is further optimized by computing the key in parallel to the transmission of a data packet. However, the additional pipelining (parallelism) results in increased area and power consumption. Once the new physical layer key is produced, a control signal is generated to update the mapping scheme and to write the scheme into the addressable block memory on the FPGA, which is referred to as mapping buff.

Both Methods A and B described in Section 3.1 were implemented using a combination of Xilinx SysGen hardware modules and Verilog-based control functions. Since the spectrum characteristics used to derive the keys are random, a function written in Verilog uniquely identifies integer numbers from the LFSRs to create unique mapping sequences for the specified interleaver depth. Once validated, the mapping sequences are written into the mapping buff implemented using the RAM.

With the mapping buff loaded with the interleaver mapping sequences, the system sends a start signal to the interleaver. Upon receiving the start signal, the data to interleave is read from the input buffers to an addressable block memory on the FPGA, which is referred to as data buff. Once data buff has sufficient data to comprise a frame, the functional module interleaves the data by reading data buff out-of-order based on the addresses stored in mapping buff that correspond to the new mapping scheme. The base processing delay due to the interleaving of any given encryption mapping is a function of the buffer size required to store the last of the data being read out. Optimization of the time required for buffering is not a viable option as the proposed key generation scheme uses a random mapping order that results in a base delay corresponding to the maximum frame size that is interleaved.

Switching into the Phy-Leave secure mode on the FPGA requires the rest of the pipeline to accommodate the additional delay due to base processing. The interleaver of the baseband pipeline may be placed between the convolutional encoder and the QAM symbol mapping modulation units, as shown in FIG. 4 that shows a transmitter 405 and receiver 455. FIG. 4 shows the modified OFDM pipeline with the data being transmitted first undergoing the standard convolutional encoding 410 to reduce the effect of random transmission errors. The data then passes through the modified PhyLeave interleaver 411 to reduce burst errors and add a means of physical layer security (Adding an obfuscation key) to the system. After which the data undergoes symbol mapping 412 to utilize the QAM modulation scheme. After symbol mapping, pilot tones are inserted 413 to assist with the message reception. Finally, the inverse Fourier transform is applied 414 to transmit the data over the air.

Upon receipt at the receiver 455, the packet is detected 453, Fourier transform applied 454, pilot tones removed 453. Then there is symbol de-mapping 452, de-interleaving (and removal of the obfuscation key) 451, and finally the data is decoded 456.

The encoder may delay sending more data if the interleaver is switching to the Phy-Leave secured mode or implementing other policy changes. In addition, the QAM modulator delays reading partial (or null) data while waiting for the interleaver to switch into secure mode or make policy changes. All the sub-blocks that constitute the scalable OFDM core within the SDC testbed are insensitive to functional latencies with respect to each baseband module.

Therefore, the extra processing latency introduced by the implementation of the Phy-Leave security protocol in the interleaver does not interfere with the physical layer implementation of the baseband.

3.3.3 Implementation of Phy-Leave on FPGA

Interleaving is typically completed using a convolution or block-based methodology, which differ in terms of resources required and the speed of operation. The PhyLeave technique described herein my apply, without limiting the invention, to block-based interleaving, which allows for increased flexibility when interleaving various frame sizes. The physical layer key generated by the methodology discussed in Section 3.1 is used as a seed for a memory address generator, of which two implementations are provided in Section 4. The memory address generator uses a dynamic sequence to place the content of the memory into a data sequence set for transmission. The receiver may use a de-interleaver that performs the opposite function of the interleaver. The receiver is provided the same physical layer key as the transmitter, generated with the technique described in Section 2. The memory address generator stores the received data in the original pre-interleaved order. The memory may be read to verify transmission of the original message.

4. Performance Evaluation

The Phy-Leave security technique may use keys generated by known processes, which were implemented using the Wireless Open-Access Research Platform (WARP) with a 802.11-2012 based experimental setup. The implementation of the Phy-Leave system through both MATLAB simulation and on a Virtex 6 ML605 FPGA is described in this section.

4.1 Interleaver Validation

As interleavers are designed to mitigate the effects of burst errors by spreading the error bits across the packet, which enables forward error correction, the effect on the bit error rate (BER) is characterized when implementing the Phy-Leave technique. An analysis and comparison of the BER between Phy-Leave interleaving with halfrate convolutional coding, IEEE 802.11a interleaving with half-rate convolutional coding, and without coding and interleaving is performed through simulation. Note that the single stream mode of IEEE 802.11n and IEEE 802.11a apply identical interleaving operations. However, an additional permutation may be required for multiple input multiple output (MIMO) 802.11n systems. As a single input single output (SISO) system is considered in this work, the use of the IEEE 802.11a interleaver is appropriate and interchangeable with IEEE 802.11n operating in SISO mode. A 20 MHz OFDM signal is considered with Quadrature Phase Shift Keying (QPSK) modulation, 64 sub-carriers (48 used for data), a cyclic prefix of 16, a minimum mean square error channel equalizer with ideal noise variance estimates, and perfect synchronization. The length of the Phy-Leave interleaver was constrained to match the block-type interleaver used in IEEE 802.11a for fair comparison. A 802.11n TGn multipath fading channel model was applied, which included the power delay profile F and varying levels of bit energy to noise spectral density ratios (normalized signal-to-noise ratio).

The selected model represents a large indoor and/or outdoor hotspot environment. In addition, the model consists of six clusters and includes an RMS delay spread of 150 ns, a maximum delay of 1050 ns, and a Rician K-factor of 6 dB. As an additional point of comparison, the analysis of an uncoded QPSK without interleaving is provided to characterize and emphasize the benefits of coding and interleaving provided by the proposed system transmitting over a model of a WLAN TGn channel.

Figure 5:
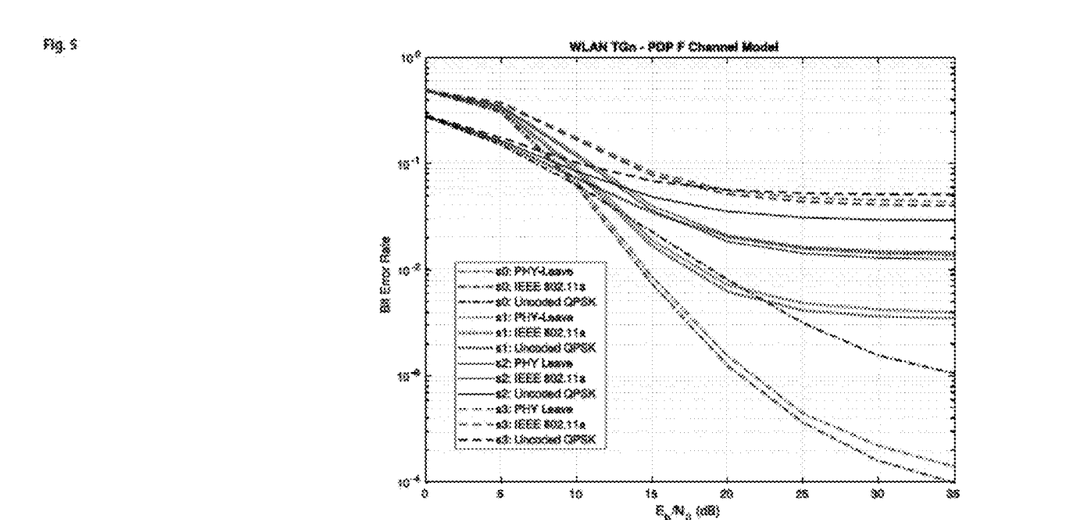
FIG. 5 shows a comparison of the bit error rate (BER) of the Phy-Leave and the IEEE 802.11a interleaver using a WLAN TGn channel model.

The interleaver performance for cases with and without an active noise signal jammer is characterized through analysis of the bit error rate (BER), with results shown in FIG. 5. A signal-to-interference ratio of 5 dB relative to the received signal is specified. For scenario 0 (s0), no active jamming is applied, while a jammer is present in all other cases. The s1, s2, and s3 scenarios correspond to, respectively, 1 MHz, 2.5 MHz, and 5 MHz bandwidths of the jammer.

Coding and interleaving is shown to provide a benefit over the uncoded QPSK technique for energy per bit to noise prefix of 16, a minimum mean square error channel power spectral density ratios $E_b/N_0$ greater than 10 dB. An $E_b/N_0$ crossover point known as the coding threshold exists, at which point an interleaver implementing forward error correction produces a lower performance as measured by an increase in the BER when compared with an uncoded scheme. The BER is shown to increase with the bandwidth of the jammer. The use of Phy-Leave results in a small reduction in the performance of the wireless system as compared to the IEEE 802.11a standard interleaver, which is expected as the standard method is designed to optimally spread burst errors. The observed loss of 0.3 dB for a BER of 10–2 without a jammer and 0.7 dB for a BER of 10–2 with a 1 MHz bandwidth jammer is considered an acceptable tradeoff for the security provided to the communication channel.

4.2 Experimental Setup

In order to implement and characterize the Phy-Leave obfuscation technique, a simulation framework was developed in MATLAB sysGen to transmit and receive packets through a simulated channel. The simulator accepts a string of data, a key sequence, a target signal-to-noise ratio (SNR), and burst noise control to accurately analyze data through the stages of the transmitter and receiver depicted in FIG. 4. The simulation framework allows for the characterization of the system under various noise constraints as well as when partial key information is known by the adversary. The wireless transmitter and receiver were implemented through an AWGN channel with adjustable SNR to allow for a controlled testing environment.

Figure 6:
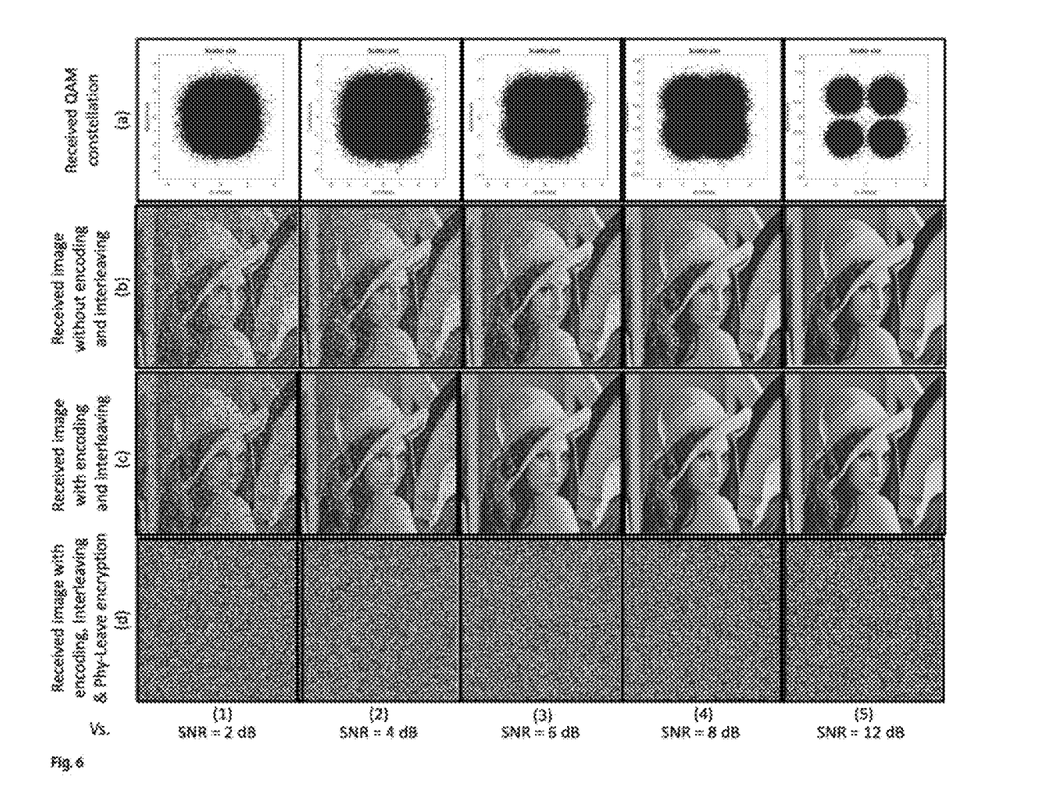
FIG. 6 shows certain experimental results.

QPSK was selected as the per sub-carrier modulation scheme for the payload. The effects of noise on QPSK are shown in FIG. 6 row (a). Based on the quadrant a signal is received in, the demodulator at the receiver determines if the received symbol is bit-mapped to "00," "01," "10," or "11," which represents the original bit sequence. A channel with a lower SNR shifts the received symbol further from the quadrant at which it is expected and, therefore, results in a demodulation to an incorrect pair of bits.

4.3 Interleaver Performance

The MATLAB simulation described in Section 4.2 is used to analyze the Phy-Leave technique for SNRs of 2, 4, 6, 8, and 12 dB and with the following experimental configurations:

without FEC encoding/decoding and interleaving,
with FEC encoding/decoding and interleaving, and
with FEC encoding/decoding and the Phy-Leave interleaving system.

The results characterizing the received QPSK constellation and the three experimental configurations are shown in FIG. 6, where the sub-figures are described as:

a (1) to a(5): The quality of the received symbols improves as the SNR increases.

b (1) to b(5): The processed and decoded result corresponding to SNRs of 2, 4, 6, 8, and 12 dB for the case where there was no encoding or interleaving. The received image improves as the SNR increases.

c (1) to c(5): The case where coding and interleaving is applied. The image is received with improved quality as compared to b(1) to b(5).

d (1) to d(5): The case where the receiver, without knowledge of the key, is attempting to decode the received symbols that were obfuscated using Phy-Leave interleaving at the transmitter.

The results indicate that the receiver is not able to recover the transmitted image without knowledge of the key. The data is decoded correctly, similar to the case shown in c(1) to c(5), when the independently generated key is used to properly set the mapping within the Phy-Leave decryption block of the receiver. For FPGA and MATLAB simulations of the implemented Phy-Leave technique, the key is assumed known at the receiver to correctly decode the transmission. Otherwise, the BER is close to the 50% theoretical worst.

4.4 Resource Utilization and Pipeline Performance

Figure 7:
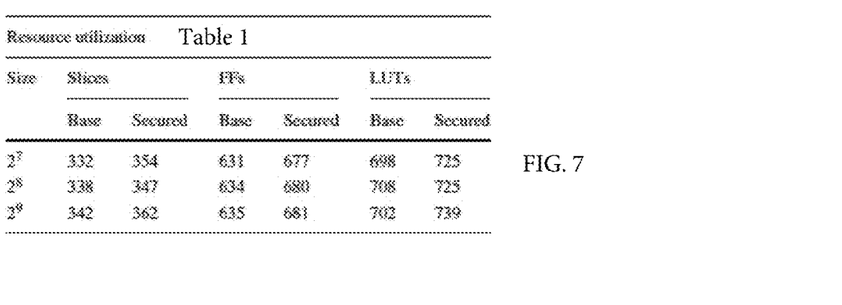
FIG. 7 shows Table 1, which shows resource utilization as a function of total slices, flip-flops (FFs), and lookup tables (LUTs) on the Virtex6 FPGA for symbol sizes of 27, 28, and 29 as compared to a standard interleaver implementation.

The FPGA resources needed to implement the Phy-Leave system and the standard interleaving method are listed in FIG. 7, Table 1. The tabulated results indicate an average utilization difference of 17 occupied slices, 46 flip-flops, and 27 lookup tables (LUTs) when Phy-Leave is implemented instead of the standard interleaver; a nominal increase in resource utilization. The resources required to implement the PhyLeave core are less than 1% of the FPGA fabric of a Virtex6 ML605 board used for experimental verification of the obfuscation technique.

The scaling of the Phy-Leave core to secure larger symbol sizes (27, 28, 29) required an additional 14 occupied slices, 2 flip-flops, and 7 LUTs. Although the Phy-Leave core can be modified to accommodate encryption across OFDM symbols, it is recommended that obfuscation based on Phy-Leave is executed within an OFDM symbol to reduce the complexity of implementing other frame-based baseband modules.

The only additional latency of the Phy-Leave system over the standard implementation is when updating the key used by the interleaver. The interleaver stalls the pipeline to perform an update only if the securing policy provides no idle time between consecutive packets. One possible technique that masks the latency of updating the key utilizes the idle time between packet frames, as implemented in this paper for a transceiver that includes an interleaver symbol size of 100 and applies QAM modulation over a 128 wide OFDM symbol size.

The time required to complete a key update in the event of a stall is directly proportional to the size of the interleaver. Therefore, the loading time of a mapping scheme for a 100 point interleaver is less than the time for a 200 point interleaver. The FPGA resources required to implement a large interleaver depth is negligible, with a maximum increase of 7% in total slices, flip-flops, and lookup tables, as indicated by the data listed in Table 1. The latency in updating a key is further reduced by parallelizing the process of loading the interleaver mapping registers.

6. Conclusion

The obfuscation of the physical layer with the Phy Leave interleaver is presented in this paper to increase the security of wireless communication. A key policy capable of rolling updates and an interleaver system that obfuscates packet transmissions is presented and implemented on a Virtex6 FPGA with less than 1% area overhead and no impact to the clock frequency. Experimental results demonstrate that when an incorrect key is applied, a BER of approximately 50% (essentially random) is seen at the receiver. The increased security, including the determination of the physical layer key and the rolling updates to the physical key, and the low overhead to implement the PhyLeave technique demonstrate that packet obfuscation at the physical layer provides a means to increase the security of wireless communication.

II. Pilotcrypt Security

1. Introduction

PilotCrypt may rearrange data-bearing and pilot tone sub-carriers, requiring the receiver and transmitter to share a secret key prior to communication. The unique identical keys can either be the result of shared, present, or generated processes, but the key will determine how the data and pilot signals are rearranged. The core architecture PilotCrypt may be built on Scalable Orthogonal Frequency Division Multiplexing (SOFDM), and provides a high flexibility, which allows for data and pilot sub-carrier assignment on a symbol to symbol basis. The ability for an eavesdropper to perform a brute force attack prior to the key being altered is severely reduced due to the capability of the aforementioned system to modify sub-carrier allocation. An eavesdropping adversary may not be able to receive the correct information as the pilot tone and data allocations are unknown. As a physical layer=based security technique integrated with an OFDM pipeline, PilotCrypt may require a low power and low resource utilization implementation. Low overhead security is vital for IoT applications that struggle to handle software layer-based security. Specific applications may either use this as a low-cost security solution, or an additional security component to existing software level security, creating a more challenging system for an adversary to crack.

2. Implementation

SOFDM is a run-time adaptable, modular and latency insensitive testbed for OFDM waveforms implemented completely on a Field Programmable Gate Array (FPGA). The system may have the capability to dynamically select each sub-carrier of the OFDM signal to be either an active data-bearing carrier, a pilot tone used for training, or a nulled carrier containing no frequency domain energy. Although the total number of subcarriers within an OFDM signal is based on the FFT size used, it is common practice to null the DC carrier and additional edge bands, as seen in both IEEE 802.11 and Long Term Evolution standards. The nulling of sub-carriers reduces the complexity and cost of the receiver while ensuring that the system does not cause out of band interference. In addition, it is important to note that it is preferable to spread pilot tones throughout frequency to maintain the favorable channel robust characteristics of OFDM and to permit interpolation based sychronization and equalization methods. The pilot tone insertion block of SOFDM tracks the data accumulating in its input buffer and waits until it has enough data to fill an entire OFDM symbol. Once the required number of data points have been accumulated, the piloting block serially outputs the data to the IFFT blocks with pilot tones embedded in them on subcarriers, according to the selected configuration (standard or non-standard).

Figure 8:
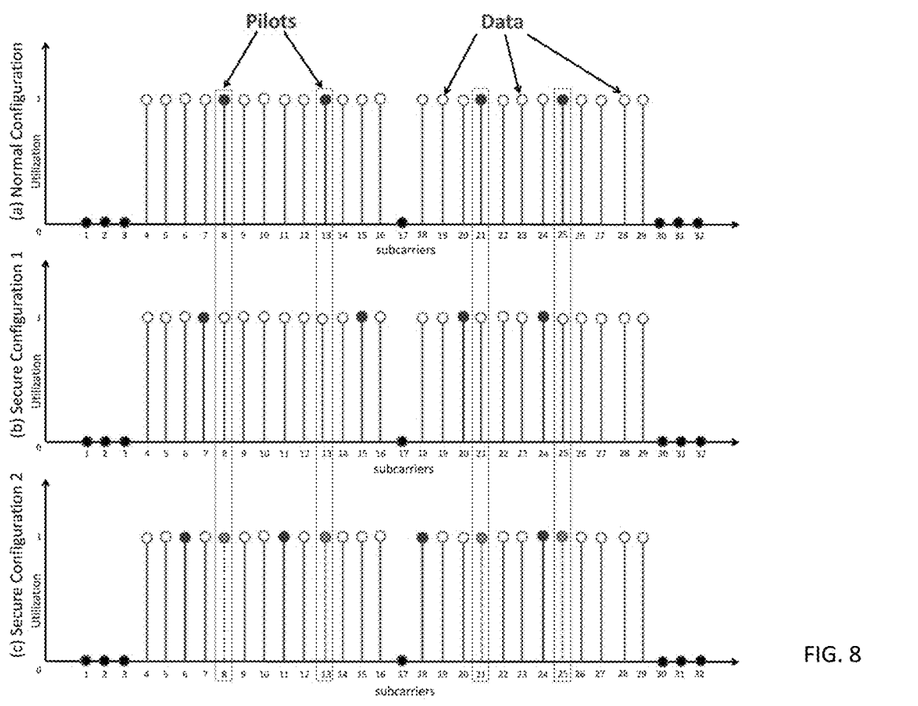
FIG. 8 shows sub-carrier allocation schemes.

Although a more realistic configuration would consider using an FFT size of 64 or larger, for the purpose of conceptual understanding and visualization, a simplified example is shown in FIG. 8 for an FFT size of 32. In FIG. 8 plot (a), the pilots have been assigned to sub-carriers 8, 13, 21, and 25, and are highlighted in the image as the normal configuration of the sub-carrier allocation. The other active sub-carriers are data-bearing, and the remaining sub-carriers without utilization are nulled for reasons discussed previously. At the receiver side the pilot tones are separated from the data sub-carriers by the de-piloting block that is aware of the location of the sub-carriers. Synchronization and equalization algorithms are implemented on the received pilot tones, allowing for the data sub-carriers to be recovered with better accuracy. The mapping sequence within these modules are implemented using block Random Access Memory (RAM) blocks that are able to be written and read from using the Microblaze processor on the FPGA. This paper discusses two configurations of PilotCrypt used for securing wireless communication.

A. Configuration 1

In this configuration, the PilotCrypt module reassigns the pilot tones onto sub-carriers that previously had been reserved for data. Once a key has been established between the transmitter and receiver, the PilotCrypt module stalls the processing of the baseband pipeline through the piloting block by bringing its rfd (ready for data) signal low and writes the block RAMs with the new OFDM sub-carrier allocation that has to be used. The sub-carrier allocation module of the transmitter then sets its rfd signal back to high and embeds pilot tones into the data as per the newly loaded mapping scheme. The receiver propogates the appropriate mapping changes to the remainder of its chain. FIG. 8 plot b is an example of this configuration scheme where the pilots have been reassigned from 8 to 7, 13 to 15, 21 to 20, and 25 to 24. An intruder trying to eavesdrop in this scenario will be unaware of this change in pilot location and run its correction and synchronization on data carriers, negatively impacting data retrieval. In this scenario it is important to note that the original single-carrier modulation used by the pilot tone sub-carriers does not need to change. Common implementations of pilot tones use Binary Phase Shift Keying (BPSK) as the modulation type due to robustness to noise and channel effects. If the intention is to maintain a standard configuration, or at least appear to be, it is advantageous to maintain the same modulation type, since deciphering between BPSK and a Quadrature Amplitude Modulation (QAM) signal is straight forward. The trade-off of maintaining the same modulation order would be a decrease in throughput overall; however, these effects may be mitigated through adaptive bit loading on other sub-carriers (increasing the QAM order of data-bearing sub-carriers). Alternatively, the initial configuration could also use Quadrature Phase Shift Keying for pilot tone modulation, which is difficult to discern from higher orders of QAM, and has similar performance characteristics to BPSK.

B. Configuration 2

The second configuration is more in defense against a specific threat model where an attacker utilizes reactive jamming targeting pilot tones. In this scenario the PilotCrypt module reassigns the pilot signals onto sub-carriers that would otherwise be data carriers while assigning dummy data on pilot sub-carriers in order to deceive adversaries. This technique also reduces throughput which can be handled through adaptive bit loading as discussed in the previous configuration. The assignment of the dummy data with high energy, low energy and nulling is being studied with the aim to take a more offensive stance against intruders rather the passive defensive one in Configuration 1. FIG. 8, plot (c) is an example of this configuration scheme where the pilots have been reassigned from 8 to 6, 13 to 11, 21 to 18, and 25 to 24. While the original pilot sub-carriers locations of 8, 13, 21, and 25 are assigned dummy pilot tones.

While the invention has been described with reference to the embodiments above, a person of ordinary skill in the art would understand that various changes or modifications may be made thereto without departing from the scope of the claims.

The invention claimed is:

1. A wireless communications security system that secures communication between at least two parties comprising:
a transmitter that transmits a packet, the transmitter including an interleaver that receives ordered data to be transmitted, and converts, according to a mapping, the ordered data to interleaved data to be sent in the packet; and
a receiver that receives the packet, the receiver including a de-interleaver that de-interleaves, according to the mapping, the interleaved data into ordered data;
wherein the mapping is accessible at the receiver only on the condition that the receiver has a key, and wherein the mapping is updated between the transmitter and the receiver synchronously and asynchronously.

2. The wireless communications security system of claim 1, wherein the interleaving and de-interleaving are done within an orthogonal frequency division multiplexing (OFDM) pipeline.

3. The wireless communications security system of claim 1, wherein the key is predetermined and is generated at the transmitter PHY layer.

4. The wireless communications security system of claim 3, wherein the key is generated using a channel state that is estimated independently at the transmitter and the receiver based on other packets exchanged between the transmitter and the receiver.

5. The wireless communications security system of claim 4, wherein the channel state is used to generate bits based on a channel symmetry that forms the key.

6. The wireless communications security system of claim 5, wherein the bits are placed into a shift registry until the occurrence of an event, upon which a current key is generated and saved to a memory.

7. The wireless communications security system of claim 6, wherein the event is time-triggered based on an interrupt.

8. The wireless communications security system of claim 6, wherein the event is event-triggered based on a number of packets transmitted or received.

9. The wireless communications security system of claim 6, wherein the current key becomes the key.

10. The wireless communications security system of claim 6, wherein lower-order k bits are extracted from the key and a hash is applied as an address to index into a read only memory (ROM) that stores multiple pre-computed mappings for the interleaver to use.

11. The wireless communications security system of claim 6, wherein a Fibonacci Linear-Feedback Shift Register (LFSR) generates pseudo-random interleaving mappings and stores the mappings into volatile memory (RAM).

12. A method of creating a secure communication link using a physical layer interleaving system comprising: implementing a key policy implementation that utilizes temporal dependency, and interleaving bits using a flexible inter and intra-block data interleaver based on updating a mapping between a transmitter and a receiver within the communication link synchronously and asynchronously.

13. The method of claim 12, wherein two wireless nodes are assigned as the transmitter and the receiver, and used to start a wireless packet exchange through a channel, wherein a channel estimation based on the exchanged packets calculated at the transmitter and the receiver is used to generate a channel symmetry based key that will get stored, and generated channel-based keys are continuously placed into a shift register.

14. The method of claim 13, wherein key bits will continue to update until a system specified event occurs, which could be a time-based interrupt or based on the number of packets transmitted.

15. The method of claim 14, wherein when the event occurs, a transfer of a current key value in the shift register into memory is triggered.

16. The method of claim 15, wherein the stored key value is used as the intermediate physical encryption key to secure the data being transmitted.

17. The method of claim 16, wherein the intermediate physical encryption key at this point can be used, combined with a software encryption key from an application layer and combined with a previously valid physical encryption key for added security in generating new physical layer encryption keys.

18. The method of claim 17, wherein the physical layer encryption key controls the interleaving sequence in an OFDM pipeline.

* * * * *